L. T. COLLIN.
CORN HUSKING MECHANISM.
APPLICATION FILED OCT. 28, 1913.
1,087,484.
Patented Feb. 17, 1914.
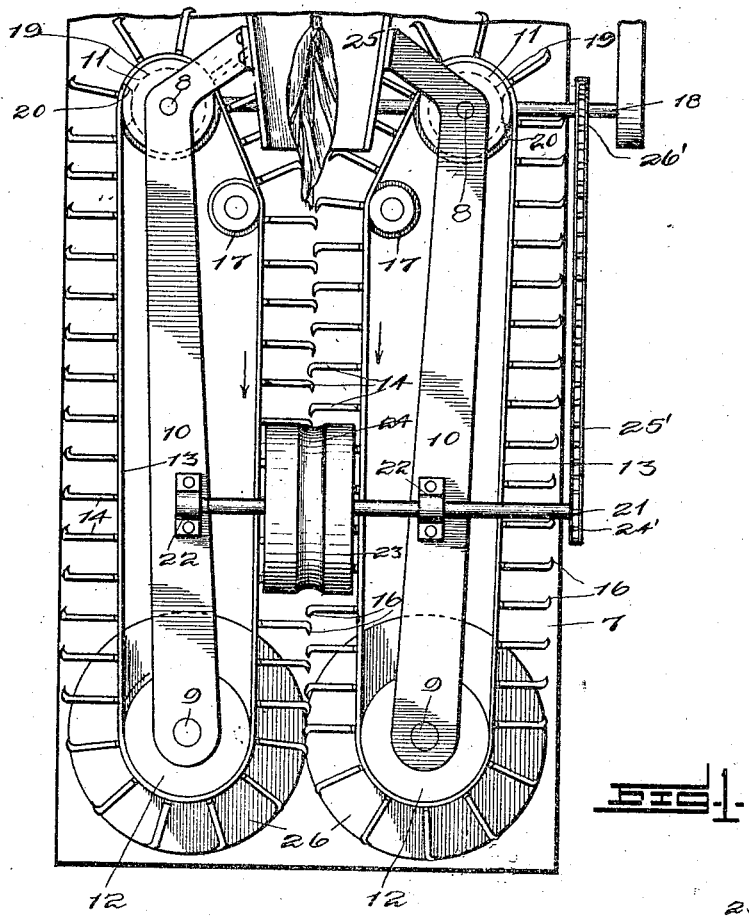
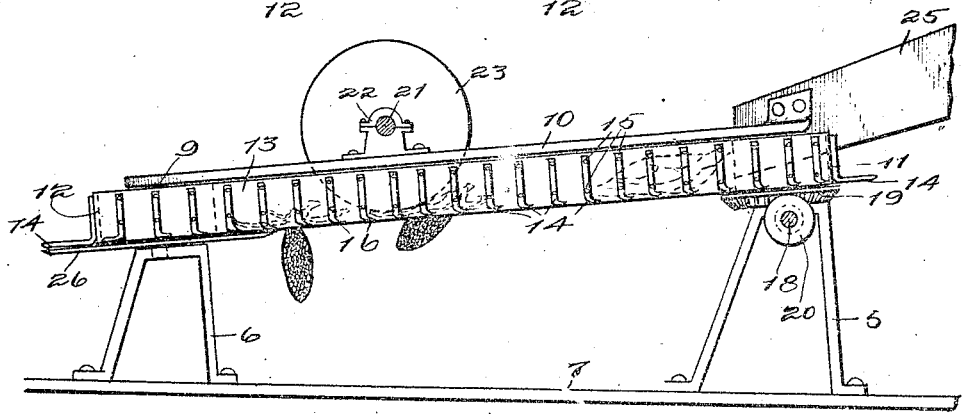
Witnesses
Inventor
Louis T. Collin,
By
C. L. Parker
Attorneys

UNITED STATES PATENT OFFICE.

LOUIS T. COLLIN, OF SACRED HEART, MINNESOTA.

CORN-HUSKING MECHANISM.

1,087,484.  Specification of Letters Patent.  Patented Feb. 17, 1914.

Application filed October 28, 1913. Serial No. 797,787.

*To all whom it may concern:*

Be it known that I, LOUIS T. COLLIN, a citizen of the United States, residing at Sacred Heart, in the county of Renville and State of Minnesota, have invented certain new and useful Improvements in Corn-Husking Mechanism, of which the following is a specification.

My invention relates to improvements in husking mechanism, for removing the husks from ears of corn.

An important object of the invention is to provide mechanism of the above mentioned character, which is of simple construction, easy to operate and will do its work in an expeditious and continuous manner.

Other objects and advantages of this invention will be apparent during the course of the following description.

In the accompanying drawings forming a part of this specification and in which like numerals are employed to designate like parts throughout the same, Figure 1 is a plan view of the husking mechanism embodying my invention, and, Fig. 2 is a side elevation thereof.

In the drawings, wherein for the purpose of illustration is shown a preferred embodiment of my invention, the numerals 5 and 6 designate end standards or supports, rigidly connected with a base 7. Suitably mounted upon the standards 5 and 6 are axles or stub-shafts 8 and 9 respectively, said stub-shafts projecting into openings formed in the longitudinal supporting strips 10. The stub-shafts 8 are spaced and arranged in transverse alinement, the same having flanged driving pulleys 11 mounted thereon, preferably beneath the longitudinal supporting strips 10.

The numeral 12 designates idle pulleys, rotatably mounted upon the stub-shafts 9 preferably below the longitudinal supporting strips 10. The idle pulleys 12 are spaced and arranged in transverse alinement, as shown. Passed about the pairs of pulleys 11 and 12 are flexible husking belts 13, which may be formed of leather, canvas or the like. Secured to the outer surfaces of these husking belts, at suitably spaced intervals, are L-shaped husking fingers 14, attached thereto by means of pins or rivets 15. The free ends of the L-shaped husking fingers are preferably hooked, as shown at 16. As clearly shown in Fig. 1, the L-shaped husking fingers 14 extend toward each other, and the husking fingers in one set are alternately arranged with relation to the husking fingers of the other set, to be in registration with the spaces between the same. Owing to the flexibility of the belts 13, these L-shaped husking fingers 14 may be moved laterally and pressed downwardly, with relation to the belts, within certain limits.

The numeral 17 designates flanged guide rollers, disposed inwardly of and near the driving pulleys 11, and serving to retain the inner portions of the husking belts parallel, the pulleys 11 being arranged farther apart than the pulleys 12, as shown.

The numeral 18 designates a transverse driving shaft, receiving its rotation from any suitable source of power. This driving shaft is suitably connected with the standard or support 5 and is arranged below the flanged pulleys 11. Rigidly connected with the lower ends of these flanged pulleys are bevel gears 19, driven by bevel gears 20 rigidly mounted upon the driven shaft 18. The husking belts 13 are driven in opposite directions, as indicated by the arrows.

The numeral 21 designates a transverse shaft, journaled through bearings 22, attached to the longitudinal supporting strips 10. Rigidly mounted upon the transverse shaft 21 is a grooved depressing wheel 23, arranged above and slightly spaced from the free ends of the husking fingers 14, with its groove 24 in alinement therewith. The shaft 21 is driven by a sprocket wheel 24′, engaged by a sprocket chain 25′ engaging a sprocket wheel 26′, rigid upon the shaft 18.

Connected with the upper ends of the longitudinal supporting strips 10, the entire apparatus being slightly inclined, as clearly illustrated in Fig. 2, is an inclined feed chute or hopper 25, for supplying ears of corn to the L-shaped husking fingers, between and adjacent the guide pulleys 17.

The pulleys 12 are provided at their lower ends with circular cutting blades 26, rotating therewith.

The operation of the mechanism is as follows: The ears of corn are successively fed through the feed chute or hopper 25, to the upper side of the L-shaped husking fingers 14, between and adjacent the guide pulleys 17, and conveyed thereby in engagement with and beneath the depressing wheel 23. This depressing wheel forces the smaller end of the corn between the husking finger 14, whereby the husks are stripped from the same but still remain attached to the large end of the ear, the ear being now moved partly or wholly below the husking fingers and suspended by the husk attached thereto which remains above the husking fingers. Further travel of the ear of corn, thus partly husked, draws the large end of the same in contact with the revolving cutting blades 26, whereby the husk is cut from the ear of corn. The corn at once drops down and may be collected by any suitable means, while the husk is carried on to the discharge end of the endless belts 13.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. In husking mechanism, the combination of a plurality of endless belts approximately equidistantly spaced longitudinally, husking fingers arranged on said belts and extending outwardly thereof, means for feeding husk carrying ears of corn onto the husking fingers to travel longitudinally of the belts, and a depressing wheel arranged remote from the point of feeding to effect the husking operation.

2. In husking mechanism, the combination with a plurality of endless belts, having inner side portions arranged approximately parallel for the greater portion of their length; of husking fingers arranged on the endless belts and extending outwardly therefrom; means for feeding husk carrying ears of corn onto the fingers to travel longitudinally therewith; and a depressing element arranged remote from the feeding point and near the husking fingers to force the ears downwardly through the space between the husking fingers without stopping the longitudinal movement of the ears.

3. In husking mechanism, the combination with a plurality of endless belts arranged near and spaced from each other, of husking fingers carried by the endless belts and extending laterally therefrom, means for applying pressure to the ears of corn to force the same between the husking fingers whereby the husks are partly separated from the ears, and means to cut the husks from the ears.

4. In husking mechanism, the combination with a plurality of approximately horizontally arranged teeth carrying husking endless belts, of means for feeding ears of corn upon the teeth of the endless belts, a depressing wheel arranged near and above the teeth, and rotatable cutting means arranged near the discharge end of the endless belts and below the teeth.

5. In husking mechanism, the combination with a plurality of approximately horizontally arranged finger carrying husking endless belts, of means for feeding ears of corn upon the fingers of the endless belts, a depressing wheel arranged near and above the fingers, means to positively rotate the depressing wheel, and rotatable cutters arranged below the fingers at the discharge end of the endless belts and driven thereby.

6. In husking mechanism, the combination with a plurality of endless belts arranged approximately parallel for the greater portion of their length, of husking fingers arranged upon the belts and extending outwardly therefrom, means for feeding husk carrying ears of corn upon the fingers near and between corresponding end portions of the belts, a depressing element arranged near the opposite corresponding ends of the belt, and means for driving the depressing element.

In testimony whereof I affix my signature in presence of two witnesses.

LOUIS T. COLLIN.

Witnesses:
R. T. DALY,
WM. O'CONNOR.